US007255929B2

(12) United States Patent
Turnquist et al.

(10) Patent No.: US 7,255,929 B2
(45) Date of Patent: Aug. 14, 2007

(54) USE OF SPRAY COATINGS TO ACHIEVE NON-UNIFORM SEAL CLEARANCES IN TURBOMACHINERY

(75) Inventors: Norman Arnold Turnquist, Sloansville, NY (US); Mark William Kowalczyk, Amsterdam, NY (US); Farshad Ghasripoor, Glenville, NY (US)

(73) Assignee: General Electric Company, Niskayuna, NY (US)

( * ) Notice: Subject to any disclaimer, the term of this patent is extended or adjusted under 35 U.S.C. 154(b) by 419 days.

(21) Appl. No.: 10/735,504

(22) Filed: Dec. 12, 2003

(65) Prior Publication Data

US 2005/0129976 A1 Jun. 16, 2005

(51) Int. Cl.
*F01D 11/14* (2006.01)
*B32B 3/26* (2006.01)
*B32B 3/02* (2006.01)
*B32B 7/02* (2006.01)
*B32B 15/04* (2006.01)

(52) U.S. Cl. .................. 428/573; 428/539.5; 428/600; 428/680; 428/213; 416/174

(58) Field of Classification Search .................... None
See application file for complete search history.

(56) References Cited

U.S. PATENT DOCUMENTS 3,923,431 A * 12/1975 Abbey ....................... 418/61.1
4,779,421 A * 10/1988 Fellows ....................... 60/525
4,923,377 A * 5/1990 Cavalleri ..................... 418/98
5,127,795 A * 7/1992 Plemmons et al. ......... 415/177
5,181,826 A * 1/1993 Rock ....................... 415/173.1
5,439,348 A * 8/1995 Hughes et al. ........... 415/173.4
5,962,076 A 10/1999 Mason et al.
6,089,825 A 7/2000 Walden et al.
6,161,836 A * 12/2000 Zhou .......................... 277/355
6,331,103 B1 * 12/2001 Teraoka ...................... 418/181

(Continued)

OTHER PUBLICATIONS

UP Phadke, et al, "Aerodynamic aspects of the sealing of gas-turbine rotor-stator systems Part 1: The behavior of simple shrouded rotating-disk systems in a quiescent environment", Jun. 1988, Int. J. Heat and Fluid Flow, vol. 9, pp. 98-105.

(Continued)

*Primary Examiner*—Jennifer McNeil
*Assistant Examiner*—Jason L. Savage
(74) *Attorney, Agent, or Firm*—Paul J. DiConza; William E. Powell, III

(57) ABSTRACT

The invention provides spray coatings to achieve circumferentially non-uniform seal clearances in turbomachines. In steam and gas turbines it is desirable to assemble the machines with elliptical seal clearances to compensate for expected casing distortion, rotordynamics or phenomena that cause circumferentially non-uniform rotor-stator rubs. The claimed invention allows the casing hardware to be fabricated round, and a spray coating is applied to the radially inner surface such that the coating thickness varies circumferentially, providing the desired non-uniform rotor-stator clearance during assembly.

33 Claims, 1 Drawing Sheet

U.S. PATENT DOCUMENTS

| | | | | |
|---|---|---|---|---|
| 6,334,617 | B1 | 1/2002 | Putnam et al. | |
| 6,341,938 | B1 * | 1/2002 | Zegarski et al. | 415/173.4 |
| 6,352,264 | B1 | 3/2002 | Dalzell et al. | |
| 6,446,976 | B1 * | 9/2002 | Key et al. | 277/367 |
| 6,533,285 | B2 | 3/2003 | Nava et al. | |
| 6,547,522 | B2 | 4/2003 | Turnquist et al. | |
| 6,655,696 | B1 * | 12/2003 | Fang et al. | 277/409 |
| 2002/0192014 | A1 * | 12/2002 | De Villiers | 403/78 |
| 2005/0138806 | A1 * | 6/2005 | Schilling et al. | 29/889.22 |
| 2005/0238484 | A1 * | 10/2005 | Lawson et al. | 415/173.1 |

OTHER PUBLICATIONS

UP Phadke, et al, "Aerodynamic aspects of the sealing of gas-turbine rotor-stator systems Part 2: The performance of simple seals in a quasi-axisymmetric external flow", Jun. 1988, Int. J. Heat and Fluid Flow, vol. 9, pp. 106-112.

UP Phadke, et al, "Aerodynamic aspects of the sealing of gas-turbine rotor-stator systems Part 3: The effect of nonaxisymmetric external flow on seal performance", Jun. 1988, Int. J. Heat and Fluid Flow, vol. 9, pp. 113-117.

TN Rhys-Jones, 1990, "Thermally Sprayed coating systems for surface protection and clearance control applications in aero engines", Surface and Coatings Technology, 43/44, pp. 402-415.

* cited by examiner

USE OF SPRAY COATINGS TO ACHIEVE NON-UNIFORM SEAL CLEARANCES IN TURBOMACHINERY

BACKGROUND OF THE INVENTION

The invention relates to seal clearances in rotary machines. More particularly, the invention relates to a method to modify the stationary casing in a manner to compensate for circumferentially non-uniform rotor movements.

Rotary machines include, but are not limited to, gas turbines and steam turbines. The moving part of the turbine is called a rotor and the fixed, non-moving part i. e. housings, casings etc. a stator. Usually, the rotor rotates within a stator assembly at very high speeds, powering a generator which in turn produces electricity or power. A steam turbine has a steam path that typically includes, in serial-flow relationship, a steam inlet, a turbine, and a steam outlet. A gas turbine has a gas path, which typically includes, in serial-flow relationship, an air intake (or inlet), a compressor, a combustor, a turbine, and a gas outlet (or exhaust nozzle). Gas or steam leakage, either out of the gas or steam path or into the gas or steam path, from an area of higher pressure to an area of lower pressure, is generally undesirable. For example, gas path leakage in the turbine or compressor area of a gas turbine, between the rotor of the turbine or compressor and the circumferentially surrounding turbine or compressor casing, will lower the efficiency of the gas turbine leading to increased fuel costs.

In practice, clearances between the rotating and stationary parts are often designed to be sufficiently large so that minimal contact occurs during the operation of the engine. However, overly generous clearances tend to promote undesirable leakages and decreased performance. In some machine designs, where reduced clearances have been designed for better efficiency, contact between rotor and stator is anticipated and accommodated by disposing a seal, such as a brush seal or an abradable seal, between these components. Abradable seals applied on the stationary parts of the gas or steam turbines have been used in order to allow the components from the rotating part (e.g. bucket tips, shaft teeth, etc.) to come into contact with the stator without suffering significant damage or wear. Contact between rotating elements and the abradable seal results in trenches worn into the abradable seal, creating a tight clearance between the two.

Effects such as thermal distortion of the casing and vibrations due to rotor dynamics often cause the path of relative rotor motion to become circumferentially non-uniform with respect to the stator. This non-uniformity of motion can lead to substantial contact in preferential, localized areas of the stator, resulting in undesirable amounts of component wear. A number of approaches have been tried to compensate for this non-uniform motion and resultant prevention of contact. Conventionally, machine parts have been machined circular and assembled with generous uniform clearances to prevent contact. The large clearances allow for more gas or steam to escape, however, which degrades system performance. In certain cases, parts are machined off-center to provide non-uniform clearances, but this complicates their fabrication and significantly boosts costs. In some steam turbines, seals are segmented into 4, 6, 8, or more segments, and the segments are each machined to a different diameter. This greatly complicates turbine assembly because individual parts must be tracked and assembled insitu in their specific circumferential locations. Therefore, what is needed is a cost-effective stator component that is capable of producing non-uniform rotor clearances. A further need is for efficient methods for making such components.

BRIEF SUMMARY OF THE INVENTION

Embodiments of the present invention meet these and other needs.

One embodiment of the invention is a stator component for a turbine assembly. The stator component comprises an annular base component having an inner surface that is substantially circular in axial cross-section and a coating disposed on the inner surface of the base component. The coating has an interfacial surface in contact with the inner surface of the base component and an outer surface opposite the interfacial surface. The coating also has a thickness that varies as a function of circumferential position along the inner surface of the base component.

A second embodiment of the invention is a method for making a stator component for a turbine assembly. The method comprises providing an annular base component having an inner surface that is substantially circular in axial cross-section and disposing a coating on the inner surface of the base component. The coating has an interfacial surface in contact with the inner surface of the base component and an outer surface opposite the interfacial surface. The coating has a thickness that varies as a function of circumferential position along the inner surface of the base component.

These and other aspects, advantages, and salient features of the present invention will become apparent from the following detailed description, the accompanying drawings, and the appended claims.

BRIEF DESCRIPTION OF THE DRAWINGS

Referring now to the figures wherein like elements are numbered alike.

DETAILED DESCRIPTION OF THE INVENTION

Figure 1:
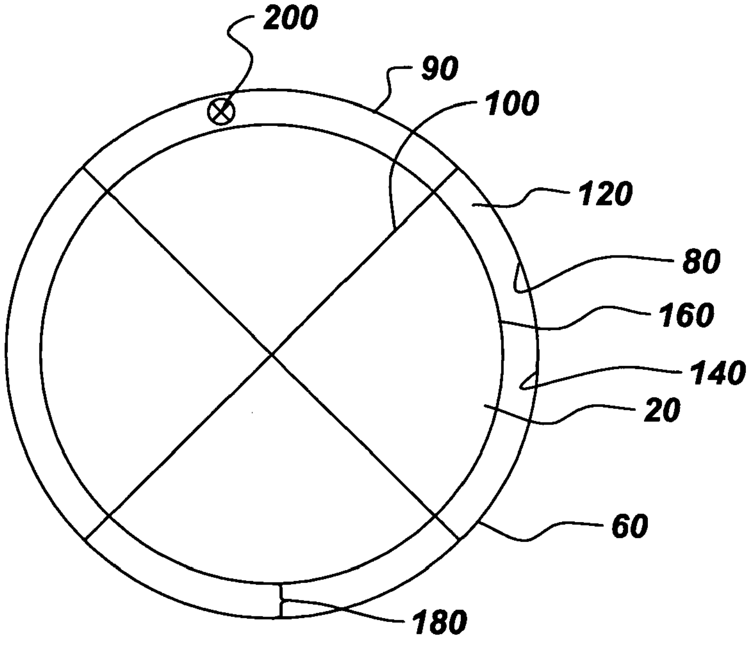
FIG. 1 is a schematic view illustrating one embodiment of non-uniform spray coating disposed on stator base component.

In the following description, like reference characters designate like or corresponding parts throughout the several views shown in the figures. It is also understood that terms such as "top," "bottom," "outward," "inward," and the like are words of convenience and are not to be construed as limiting terms. Moreover, it will be understood that the illustrations are for the purpose of describing a particular exemplary embodiment of the invention and are not intended to limit the invention thereto.

Figure 2:
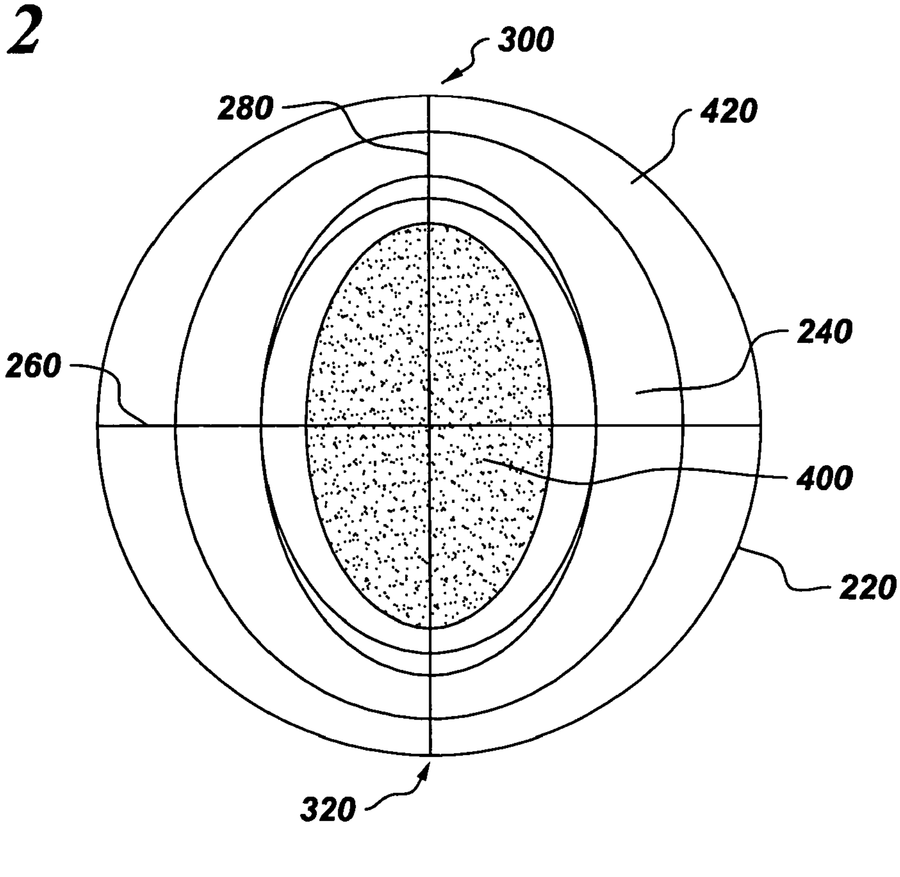
FIG. 2 is a schematic view illustrating another embodiment of non-uniform spray coating disposed on stator base component.

Referring generally to FIGS. 1 and 2, embodiments of the invention address the needs described above by providing a stator component 20 for a turbine assembly. The stator component 20 comprises an annular base component 60 which, in certain embodiments, comprises at least one of a shroud, a turbine casing and an annular assembly of turbine nozzles. The base component has an inner surface 80 that is substantantially circular 90 in axial cross-section 100; and a coating 120 disposed on the inner surface 80 of base component 60. The coating 120 has an interfacial surface 140 in contact with the inner surface 80 of the base component 60 and an outer surface 160 opposite the interfacial surface 140. Coating 120 has a thickness 180 that varies as a function of circumferential position along the inner surface 80 of the base component 60, and as a result the shape of the outer surface 160 of coating 120 departs from the circular shape of the base component 60 to more closely conform to eccentricities in the motion of the rotor, thereby providing the tightest possible clearances during service. Embodiments of the invention allow parts to be machined round and on-center, and it is the coating 120 that provides the desired non-uniform rotor-stator clearance during assembly and operation.

Experience with certain types of turbomachinery has revealed that in many cases the rotor 400 tends to follow an elliptical path of travel. Accordingly, to better conform clearances to this condition, in sonic embodiments of the present invention the outer surface 160 of the coating 120 is substantially an ellipse 220 in axial cross-section 100. The elliptical shape of the coating outer surface 160 is achieved by disposing a coating having a maximum thickness at the peripheral position where clearances are desired to be smallest (i.e., regions, such as region 240, for example, on opposite sides of the minor axis 260 of the ellipse) and a minimum thickness in areas needing the maximum clearance (i.e., regions on opposite sides of major axis 280). In certain embodiments, the base component 420 comprises a top portion 300 and a bottom portion 320 that are joined together by a horizontal joint 260, and the ellipse formed by the outer surface 160 of the coating has a major axis 280 running between the top portion 300 and bottom portion 320. Although conventional approaches as described above often machine a circular stator to the desirable elliptical shape, or assemble a complex, multi-segmented stator to achieve an elliptical shape, the application of a coating as described herein offers significant advantages in cost and simplicity.

The thickness 180 of the coating 120 is up to about 3 mm and in particular embodiments up to about 1.75 mm. In one embodiment of the invention, coating 120 comprises an abradable material 130. Abradable coatings are widely known in the art and are used for their ability to provide seals between parts with relative motion. An abradable material is defined as one that selectively and sacrificially wears away under rotor-stator contact leaving behind a profile matching that of the eccentric motion of the rotor. Extremely tight seal clearances are obtained as a result. Exemplary abradable coatings are described in U.S. Pat. No. 6,547,522. In one embodiment, the abradable material comprises a metal matrix phase and at least one secondary phase. In one embodiment, the metal matrix phase comprises at least one alloy selected from the group consisting of cobalt-nickel-chromium-aluminum (CoNiCrAlY), nickel-chromium-iron-aluminum (NiCrFeAl), and nickel-chromium-aluminum (NiCrAl). In one embodiment, the secondary phase comprises graphite. In other embodiments, the at least one secondary phase comprises at least one of a ceramic, a polymer, and a salt. In one embodiment, the ceramic comprises at least one of hexagonal BN, aluminosilicates, and calcined bentonite clay. In other embodiments, the polymer comprises at least one of polyester, polyimide, polymethyl methacrylate, silicone, siloxane, and rubber. In still further embodiments, the salt comprises at least one of aluminum phosphate and aluminum hydroxide.

In one embodiment of the invention, the coating 120 comprises a spray coating. Many different spray techniques suitable to produce coating 120 are known in the art. In certain embodiments the spray coating comprises at least one of a plasma-sprayed coating, a flame-sprayed coating, a high velocity oxygen fuel (HVOF)-sprayed coating, a thermal-sprayed coating, and a wire-arc sprayed coating.

In order to take full advantage of the features described above, a further embodiment of the present invention is a stator component 20 for a turbine assembly. The stator component 20 comprises an annular base component 60 having an inner surface 80 that is substantially circular 90 in axial cross-section 100; and a coating 120 comprising an abradable material. Coating 120 is disposed on the inner surface 80 of the base component 60 and has an interfacial surface 140 in contact with the inner surface 80 of the base component 60 and an outer surface 160 opposite the interfacing surface 140. The outer surface 160 of the coating 120 is substantially an ellipse 220 in axial cross-section 100 having a major axis 280 running between top 300 and bottom 320 portions of the base component 60.

Other embodiments of the present invention include a method for making a stator component 20 for a turbine assembly. The method comprises providing an annular base component 60 having an inner surface 80 that is substantially circular 90 in axial cross-section 100, and disposing a coating 120 in the inner surface 80 of base component 60. The coating 120 has an interfacial surface 140 in contact with the inner surface 80 of base component 60 and an outer surface 160 opposite the interfacial surface 140. Coating 120 has a thickness 180 that varies as a function of circumferential position along the inner surface 80 of base component 60.

In one embodiment of the invention, coatings are deposited using a spray coating technique as described above. To achieve non-uniformity in thickness, the spray coating is, in some embodiments, applied using a robot that is programmed to vary the number of times the spray gun passes over specific arc lengths of the circumference. Each of these so-called "passes" typically deposits a coating layer ranging from about 20 μm to about 80 μm thick. For instance, the clearance is varied by roughly 200 μm by applying about 5 more coating layers over certain areas of the casing than over other areas. Also, the arc length of each coating layer is varied from layer to layer, to provide a relatively smooth transition between the areas of thick coating and the areas of thin coating While typical embodiments have been set forth for the purpose of illustration, the foregoing description should not be deemed to be a limitation on the scope of the invention. Accordingly, various modifications, adaptations, and alternatives may occur to one skilled in the art without departing from the spirit and scope of the present invention.

What is claimed is:

1. A stator component for a turbine assembly, comprising:

an annular base component having an inner surface that is substantially circular in axial cross-section; and a coating disposed on said inner surface of said base component, wherein said coating has an interfacial surface in contact with said inner surface of said base component and an outer surface opposite said interfacial surface, and wherein said coating has a non-uniform thickness that varies as a function of circumferential position along said inner surface of said base component.

2. The stator component of claim 1, wherein said outer suffice of said coating is substantially an ellipse in axial cross-section.

3. The stator component of claim 2, wherein said ellipse has a major axis running between top and bottom portions of said base component.

4. The stator component of claim 1, wherein said thickness of said coating is up to about 3 mm.

5. The stator component of claim 4, wherein said thickness of said coating is up to about 1.75 mm.

6. The stator component of claim 1, wherein said coating comprises an abradable material.

7. The stator component of claim 6, wherein said abradable material comprises a metal matrix phase and at least one secondary phase.

8. The stator component of claim 7, wherein said metal matrix phase comprises at least one alloy selected from the group consisting of CoNiCrAlY, NiCrFeAl, and NiCrAl.

9. The stator component of claim 7, wherein said secondary phase comprises graphite.

10. The stator component of claim 9, wherein said thermally-sprayed coating process comprises at least one of a thermal-sprayed coating, a plasma-sprayed coating, a flame-sprayed coating, an HVOF-sprayed coating, and a wire-arc sprayed coating.

11. The stator component of claim 7, wherein said at least one secondary phase comprises at least one of a ceramic, a polymer, and a salt.

12. The stator component of claim 11 wherein said ceramic comprises at least one of hexagonal BN, aluminosilicates, and calcined bentonite clay.

13. The stator component of claim 11 wherein said polymer comprises at least one of polyester, polyimide, polymethyl methacrylate, silicone, siloxane, and rubber.

14. The stator component of claim 11 wherein said salt comprises at least one of aluminum phosphate and aluminum hydroxide.

15. The stator component of claim 1, wherein said coating comprises a sprayed coating.

16. The stator component of claim 1, wherein said base component comprises at least one of a shroud, a turbine casing, and an annular assembly of turbine nozzles.

17. The stator component of claim 1, wherein said turbine assembly comprises a steam turbine.

18. A stator component for a turbine assembly, comprising:

an annular base component having an inner surface that is substantially circular in axial cross-section; and a coating comprising an abradable material, said coating disposed on said inner surface of said base component and having an interfacial surface in contact with said inner surface of said base component and an outer surface opposite said interfacial surface, wherein said outer surface of said coating is substantially an ellipse in axial cross-section having a major axis running between top and bottom portions of said base component.

19. A method for making a stator component for a turbine assembly. comprising:

providing an annular base component having an inner surface that is substantially circular in axial cross-section; and disposing a coating an said inner surface of said base component, wherein said coating has an interfacial surface in contact with said inner surface of said base component and an outer surface opposite said interfacial surface, and wherein said coating has a non-uniform thickness that varies as a function of circumferential position along said inner surface of said base component.

20. The method of claim 19, wherein said outer surface of said coating is substantially an ellipse in axial cross-section.

21. The method of claim 20, wherein said ellipse has a major axis running between top and bottom portions of said base component.

22. The method of claim 19, wherein disposing said coating further comprises disposing a coating comprising an abradable material.

23. The method of claim 22, wherein said abradable material comprises a metal matrix phase and at least one secondary phase.

24. The method of claim 23, wherein said metal matrix phase comprises at least one alloy selected from the group consisting of CoNiCrAlY, NiCrFeAL and NiCeAl.

25. The method of claim 23, wherein said secondary phase comprises graphite.

26. The method of claim 23, wherein said at least one secondary phase comprises at least one of a ceramic, a polymer, and a salt.

27. The method of claim 26 wherein said ceramic comprises at least one of hexagonal BN, aluminosilicates, and calcined bentonite clay.

28. The method of claim 26 wherein said polymer comprises at least one of polyester, polyimide, polymethyl methacrylate, silicone, siloxane, and rubber.

29. The method of claim 26 wherein said salt comprises at least one of aluminum phosphate and aluminum hydroxide.

30. The method of claim 19, wherein disposing comprises disposing said coating using a spray process.

31. The method of claim 30, wherein said spray process comprises at least one of thermal-spray coating, plasma-sprayed coating, flame-sprayed coating, HVOF-sprayed coating. and wire-arc sprayed coating.

32. The method of claim 19, wherein providing said base component comprises providing a base component comprising at least one of a shroud, a turbine casing, and an annular assembly of turbine nozzles.

33. A method for making a stator component for a turbine assembly, comprising:

providing an annular base component having an inner surface that is substantially circular in axial cross-section; and disposing, by a thermal spray process, a coating comprising abradable material, said coating disposed on said inner surface of said base component and having an interfacial surface in contact with said inner surface of said base component and an outer surface opposite said interfacial, surface, wherein said outer surface of said coating is substantially an ellipse in axial cross-section having a major axis running between top and bottom portions of said base component.

* * * * *